United States Patent
Lonsdale et al.

(10) Patent No.: US 6,651,495 B2
(45) Date of Patent: Nov. 25, 2003

(54) APPARATUS AND METHOD FOR DETECTING THE CONDITION OF AN ITEM

(75) Inventors: Anthony Lonsdale, Banbury (GB); Bryan Lonsdale, Banbury (GB)

(73) Assignee: Transense Technologies plc (GB)

( * ) Notice: Subject to any disclaimer, the term of this patent is extended or adjusted under 35 U.S.C. 154(b) by 36 days.

(21) Appl. No.: 10/033,057

(22) Filed: Dec. 27, 2001

(65) Prior Publication Data

US 2002/0080045 A1 Jun. 27, 2002

(51) Int. Cl.$^7$ .............................................. G01M 17/02
(52) U.S. Cl. .......................................... 73/146; 340/442
(58) Field of Search ............................. 73/146, 146.2, 73/146.3, 146.4, 146.5, 146.8; 340/870.16, 442

(56) References Cited

U.S. PATENT DOCUMENTS

| | | | | |
|---|---|---|---|---|
| 3,577,780 A | * | 5/1971 | Sperberg | 73/146 |
| 3,640,132 A | * | 2/1972 | Miles et al. | 74/146 |
| 3,964,303 A | * | 6/1976 | Vexelman et al. | 73/146 |
| 4,028,937 A | * | 6/1977 | Crano | 73/146 |
| 4,458,526 A | * | 7/1984 | Doi et al. | 73/146 |
| 4,501,141 A | * | 2/1985 | Takayanagi et al. | 73/146 |
| 4,691,564 A | * | 9/1987 | Potts et al. | 73/146 |
| 4,969,355 A | * | 11/1990 | Doi et al. | 73/146 |
| 5,040,413 A | * | 8/1991 | Ohms | 73/146 |
| 5,103,669 A | * | 4/1992 | Kato | 73/146 |
| 5,448,910 A | * | 9/1995 | Yurjevich et al. | 73/146 |
| 6,016,695 A | * | 1/2000 | Reynolds et al. | 73/146 |
| 6,532,811 B2 | * | 3/2003 | Turner et al. | 73/146 |

* cited by examiner

Primary Examiner—Edward Lefkowitz
Assistant Examiner—Andre Allen
(74) Attorney, Agent, or Firm—Keusey, Tutunjian & Bitetto, P.C.

(57) ABSTRACT

The present invention relates to an apparatus and method for detecting the condition of an item and, particularly, but not exclusively, to an apparatus and method for detecting a specific condition of a motor vehicle tire. The invention provides apparatus comprising a structure for radiating radio frequency energy in response to a reception by said structure of radio frequency energy; said structure having a first configuration which, in use, is changed to a second configuration in response to said item attaining said specific condition; said change in configuration producing a detectable difference in radio frequency energy radiated from said structure. Apparatus according to the present invention thereby allows for the remote interrogation of the condition of an item.

16 Claims, 4 Drawing Sheets

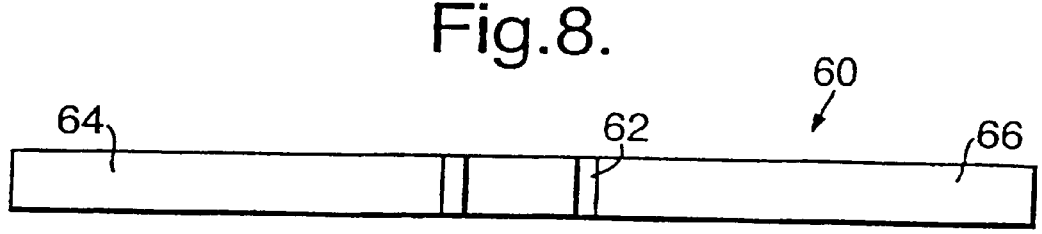
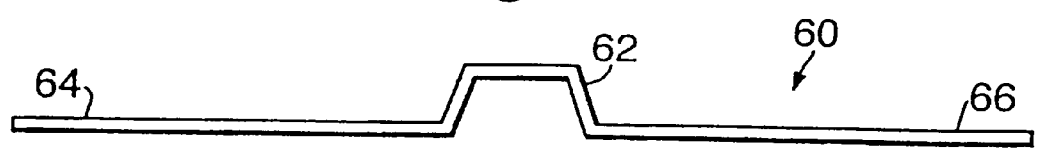
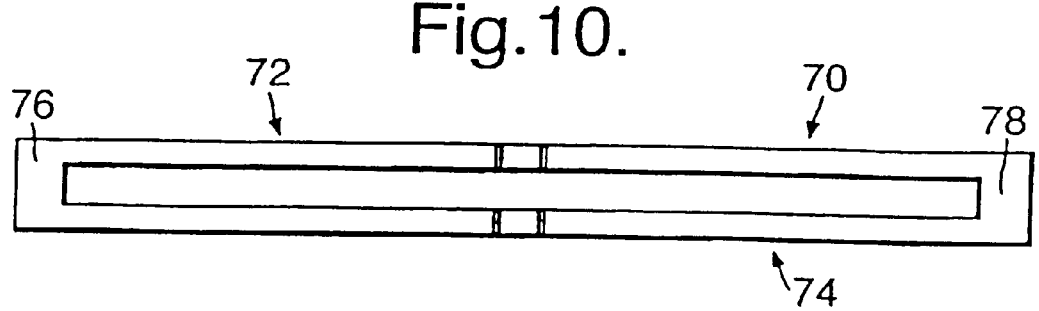

APPARATUS AND METHOD FOR DETECTING THE CONDITION OF AN ITEM

RELATED APPLICATION DATA

This application is a Continuation of International Application (WIPO) No. PCT/GB00/02488 filed Jun. 28, 2000, that designates the United States and which claims priority from British Application No. 9915952.6, filed Ju. 28, 1999.

The present invention relates to an apparatus and method for detecting the condition of an item and, particularly, but not exclusively, to an apparatus and method for detecting a specific condition of a motor vehicle tire.

It is well known for the poor condition of items such as motor vehicle brake pads to be detected by appropriate electrical means. Typically, excessive brake pad wear is indicated by the closing of a simple circuit. When the brake pads are worn to a predetermined level, a pair of spaced apart wires embedded in one or more of the pads becomes exposed. During operation of the braking system, the exposed wires are pressed against a metal brake disc and, as a result, an electric circuit is closed. Suitable means for warning the motor vehicle driver is then activated.

Although the aforementioned means for detecting a particular condition of an item is adequate for many applications, it cannot be conveniently adapted to circumstances where connection of the item in question to an electric circuit is problematic. This may be the case where the item is required to rotate at high angular velocities, for example, a motor vehicle tire.

Due to the harsh conditions in which motor vehicle tires operate, it has not been possible in the past to provide a vehicle with means for conveniently, reliably and inexpensively detecting a particular level of tire wear. Since no automatic means for indicating excessive tire wear has been available for motor vehicles, the inadvertent and highly dangerous use of over worn tires has traditionally only been avoided through frequent visual inspection of the tread on each motor vehicle tire. However, inspections of this type are time consuming and inconvenient, and they are generally not adequately completed by motor vehicle users, particularly the users of privately owned motor vehicles. As a result, many motor vehicles are driven in a dangerous condition without the knowledge of the driver.

It is an object of the present invention to provide apparatus for detecting a specific condition of an item, particularly an item located in a remote environment or exposed to harsh conditions (for example, the tire of a motor vehicle).

It is also an object of the present invention to provide apparatus for detecting a specific condition of an item in a convenient, reliable and inexpensive manner.

It is a further object of the present invention to provide detecting apparatus which does not require maintenance.

An object of the present invention is also to provide a method for detecting a specific condition of an item, particularly an item located in a remote environment or exposed to harsh conditions (for example, the tire of a motor vehicle).

Furthermore, it is an object of the present invention to provide a method for detecting a specific condition of an item in a convenient, reliable and inexpensive manner.

A first aspect of the present invention provides apparatus for detecting a specific condition of an item, the apparatus comprising: a structure for radiating radio frequency energy in response to the reception by said structure of radio frequency energy; said structure having a first configuration which in use, is changed to a second configuration in response to said item attaining said specific condition; said change in configuration producing a detectable difference in radio frequency energy radiated from said structure.

A specific level of tire wear may be detected through appropriate use of apparatus according to the present invention. For example, the structure for radiating radio frequency energy may be embedded in the rubber tread of a tire during the tire manufacturing process. The depth of tread at which the structure is located will determine the level of tire wear permitted before detection occurs. Once the tire tread has worn sufficiently for said structure of the present invention to become exposed, further use and consequential wear of the tire will cause said structure to repeatedly strike a road surface and itself become worn. Accordingly, said structure may be changed from a first configuration to a second configuration as a specific tire condition (for example, excessive wear) is attained. In consequence of the change in configuration of said structure, the characteristic response of said structure to the reception of radio frequency energy is also changed. Thus, whether or not a tire provided with apparatus according to the present invention suffers from excessive wear may be determined by periodically illuminating said tire with radio frequency energy and monitoring the radio frequency energy radiated in response thereto from said structure embedded in the tire tread.

Preferably, said structure comprises a member adapted to be ablated during use when said item attains said specific condition. It is further preferable for said structure to comprise two spaced members which are connected to one another by said member adapted to be ablated. Said structure may comprise a plurality of members adapted to be ablated during use. It is particularly desirable for at least one member of the said plurality of members to be adapted to be ablated during use when said item attains a condition different to that attained when another member of said plurality of members is ablate during use. Said structure may be a unitary component.

Furthermore, it is preferable said structure to comprise two elongate elements, first ends of the elements being connected to one another and second ends of the elements being connected to one another, each element comprising two spaced members which are connected to another by a member adapted to be ablated. A member may be adapted to be ablated by virtue of said member projecting from the remainder of said structure. Alternatively, a member may be adapted to be ablated by virtue of said member being of a material different to that of the remainder of said structure. The member adapted to be ablated may be a bi-metallic strip.

Preferably, said structure incorporates at least one elongate slot. It is further preferable for said structure to be of an elongate shape. In the first configuration, said structure ideally comprises one or more bridge elements extending from one side of the at least one slot to the other side thereof. Each bridge element preferably protrudes so as to leave vacant the space defining the slot. A bridge element or member adapted to be ablated may be a bi-metallic strip. One side of the at least one slot may be connected to the other side thereof by means of a linear or non-linear mixer.

A second aspect of the present invention provides a method for detecting a specific condition of an item, the method comprising the steps of: providing said item with the apparatus defined hereinabove for detecting a specific item condition; transmitting radio frequency energy to said apparatus and receiving radio frequency energy radiated therefrom; and monitoring for radiated radio frequency energy corresponding to the attaining of said specific condition Thus, the apparatus and method of the present invention have the advantage over the prior art of allowing the automatic detection of a specific item condition even where the item in question is located in a remote environment or exposed to harsh conditions. The apparatus of the present invention functions in a simple and passive manner. Accordingly, said apparatus is inexpensive to manufacture and can be conveniently integrated within an item to be monitored. The simple operation of said apparatus results in a high degree of reliability.

Furthermore, since the apparatus of the present invention operates in a passive mode, said apparatus does not require maintenance. Unlike other sensing means, the apparatus of the present invention does not require batteries to be installed and periodically replaced.

Embodiments of the present invention will now be described with reference to the accompanying drawings, in which:

FIG. 8 is a schematic plan view of a fourth embodiment of the present invention;

FIG. 9 is a schematic side view of the fourth embodiment; and

FIG. 10 is a schematic plan view of a fifth embodiment of the present invention.

Figure 1:
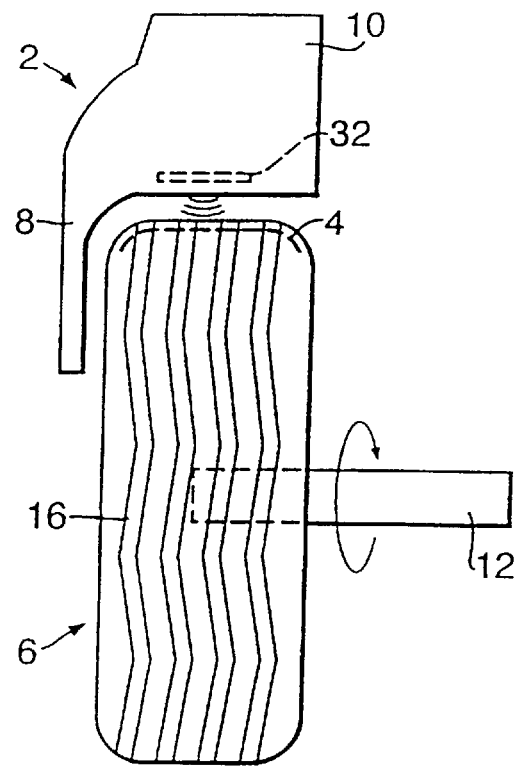
FIG. 1 is a schematic view of a first embodiment of the present invention provided within the tire of a motor vehicle.

A motor vehicle wheel assembly 2 provided with a first embodiment 4 of the present invention is shown in FIG. 1 of the accompanying drawings. The wheel assembly 2 is of a conventional type having a wheel 6 located under a wheel arch 8 of a vehicle body 10, the wheel 6 being mounted to the vehicle body 10 by means of an axle 12 and an appropriate suspension system (not shown). The first embodiment 4 is a device suitable for detecting excessive wear of a tire 16 provided on the wheel 6.

Figure 2:
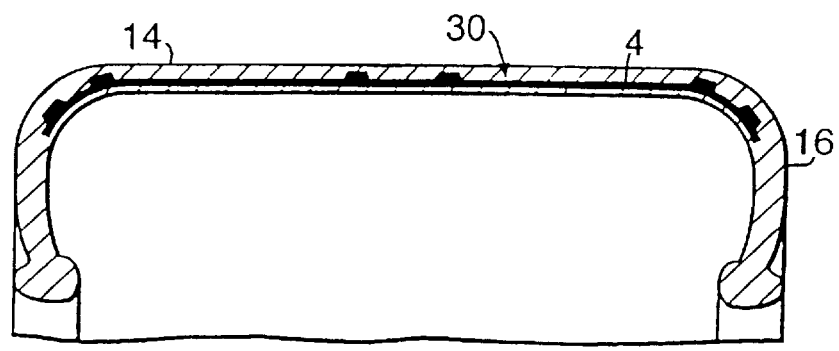
FIG. 2 is a schematic partial cross-section view of the tire shown in FIG. 1.

The first embodiment 4 of the present invention is located within a treaded rubber portion 14 of the tire 16. An enlarged cross-section view of the first embodiment 4 located within the tire 16 is shown in FIG. 2. It can be seen that the first embodiment 4 extends across the fill width of the tire 16 so as to be capable of detecting tire condition in several spaced areas of tire tread. When the tire 16 is in use, said areas of tire tread contact a road surface and are particularly prone to excessive wear. Alternatively, the first embodiment 4 may be arranged so as to extend circumferentially within the tire 16.

Figure 3:
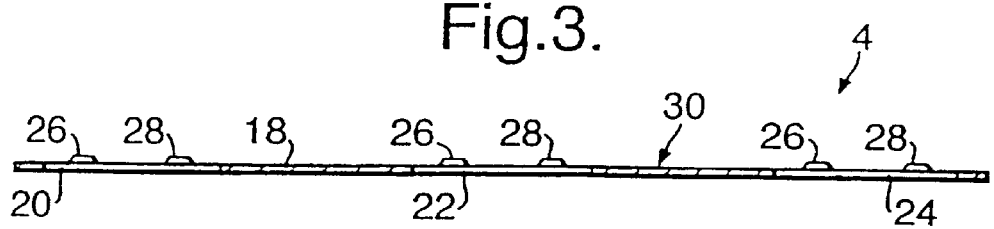
FIG. 3 is a schematic cross-section view of the first embodiment of the present invention shown in FIGS. 1 and 2.
Figure 4:
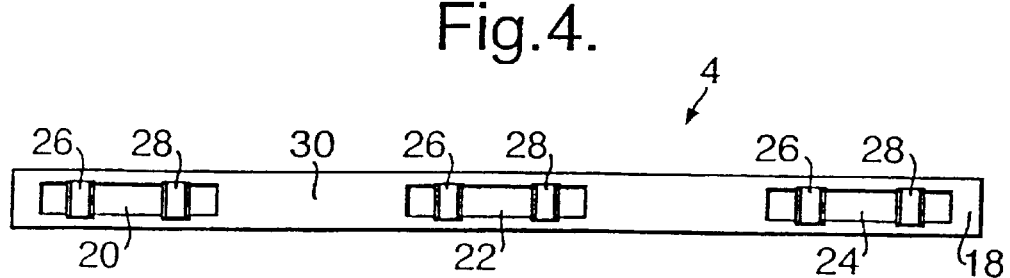
FIG. 4 is a schematic plan view of the first embodiment shown in FIG. 3, the first embodiment being arranged in a first configuration.

Two views of the first embodiment 4 prior to location within the tire 16 are shown in FIGS. 3 and 4. These figures clearly show the generally flat and elongate nature of the first embodiment 4. The first embodiment 4 is defined by a body 18 taking the form of a thin and narrow strip of material. The body 18 may be manufactured from any material suitable for receiving and radiating radio frequency energy (for example, a metallic material). The body 18 is provided with three elongate slots 20,22,24. The three elongate slots 20,22,24 are identical to one another and extend through the full thickness of the body 18. One of the elongate slots 22 is located midway along the length of the body 18, whilst the remaining two elongate slots 20,24 are located at opposing end portions of the body 18. Each of the slots 20,22,24 are rectangular in shape. The longitudinal axes of the elongate slots 20,22,24 are in line with one another and the longitudinal axis of the body 18.

The width of each elongate slot 20,22,24 is spanned by two longitudinally spaced bridges 26,28. This arrangement is most clearly shown in FIG. 4. Each of the bridges 26,28 protrudes from the body 18 as can be seen from the cross-section view of FIG. 3. This view is taken along the longitudinal axis of the body 18 and clearly shows the bridges 26,28 of each elongate slot 20,22,24 extending above an upper surface 30 of the body 18. Each of the bridges 26,28 is manufactured from a material sufficiently soft to allow said bridges 26,28 to be readily worn away when repeatedly contacting a road surface. The material from which the bridges 26,28 are made is also of a type which affects the radio frequency energy radiated by the body 18.

The first embodiment 4 is shown in FIG. 2 completely encapsulated within the treaded rubber portion 14 of the tire 16. The first embodiment 4 is located in this position during the moulding of the tire 16. The fast embodiment 4 is arranged with the longitudinal axis of its body 18 lying across the width of the treaded portion 14 and with the bridges 26,28 and the upper surface 30 of the body 18 facing radially outwardly from the axle 12. The upper surface 30 of the body 18 is located at a position corresponding to the minimum acceptable depth of tire tread.

Figure 5:
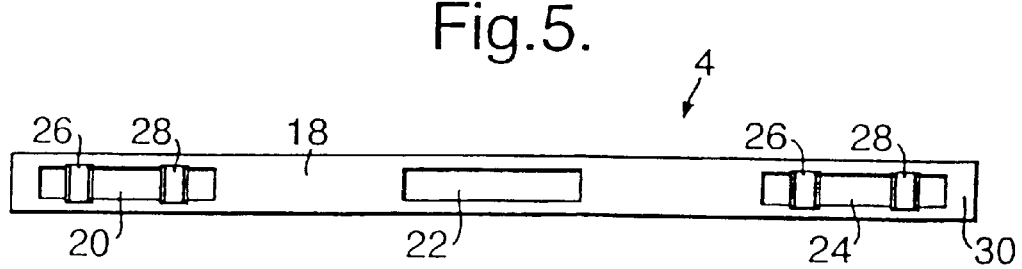
FIG. 5 is a schematic plan view of the first embodiment shown in FIGS. 3 and 4, the first embodiment being arranged in a second configuration.

As the tire 16 becomes worn and the thickness of the treaded rubber portion 14 is reduced, the raised bridges 26,28 become exposed. At this stage, the worn condition of the treaded portion 14 remains acceptable. However, further use of the tire 16 causes both a further wearing of the tire and a wearing of one or more of the bridges 26,28. When the tire 16 has worn to the minimum acceptable depth of tread (i.e. down to the depth of the upper surface 30 of the body 18), the bridges 26,28 located in this region of wear will be completely disintegrated to leave one or more partially or completely unbridged elongate slots. A plan view of the first embodiment 4 following use in an excessively worn tire is shown in FIG. 5. This figure shows a completely unbridged central elongate slot 22. Such a configuration may be caused by the excessive wear of a tire which has been over inflated The condition of a tire provided with the first embodiment 4 may be determined by remotely interrogating the first embodiment 4 so as to assess whether or not any of the bridges 26,28 have been disintegrated. Since the presence of the bridges 26,28 has an impact on the ability of the body 18 to receive and radiate radio frequency energy, the aforementioned interrogation is conveniently undertaken by transmitting appropriate radio frequency energy and monitoring the radio frequency energy radiated in response thereto by the first embodiment 4. This may be achieved by means of an interrogation device 32 incorporating an appropriate antenna and transmitter/receiver circuit. The interrogation device 32 is mounted in the wheel arch 8 above the tire 16 (see FIG. 1). Similar interrogation devices may also be mounted in a road surface (for example, the forecourt of a service station).

Other suitable locations for an interrogation device 32 will be apparent to a reader skilled in the art.

The interrogation device 32 is adapted to operate on Industrial Scientific Medical (ISM) frequencies (i.e. 868 MHz or 2.45 GHz). The length of the elongate slots 20,22,24 are matched to the interrogation frequency employed by the interrogation device 32. In this way, an unbridged slot will radiate a strong signal whereas a bridged slot will radiate only a weak signal (or no signal at all). Thus, when the bridges 26,28 are worn from one or more of the elongate slots 20,22,24, the first embodiment 4 acts as an efficient slot antenna. The amplitude of the radio frequency energy radiated from the first embodiment 4 will vary in synchronisation with wheel rotation, however the signal radiated from the or each unbridged slot will be readily detected by the interrogation device 32 and an appropriate indication of tire wear may be presented to the vehicle user.

If considered necessary, a tire may incorporate means for providing a reference signal which does not vary with tire condition. Such means may be the apparatus shown in FIGS. 3 and 4 mounted on the tire so as not to undergo a configuration change during tire use. In this way, the return signal of a bridged slot will always be available for comparison with the return signal of an unbridged slot.

Tire wear at a particular location across the width of the treaded portion 14 or to a particular depth of the treaded portion 14 may be detected through the use of elongate slots of differing lengths. Individual slots (and accordingly, the tire condition adjacent the slots) may then be interrogated through the use by an interrogation device 32 of different radio frequencies. The form of slot required to provide an adequate return signal for a given transmission frequency will be apparent to a skilled reader.

The first embodiment 4 of the present invention may be adapted to detect specific conditions of a tire other than tread wear. For example, the bridges 26,28 may be made from a material which melts at a specific temperature, said specific temperature being equal to the maximum temperature to which a tire construction may be safely exposed. In this way, when a particular tire temperature is attained, one or more of the bridges 26,28 may be designed to melt so as to leave a clean elongate slot for the efficient return of an appropriate interrogation signal. The user of a vehicle may be thereby provided with an indication that undesirable tire temperatures have been generated. Appropriate remedial action may then be taken.

Figure 6:
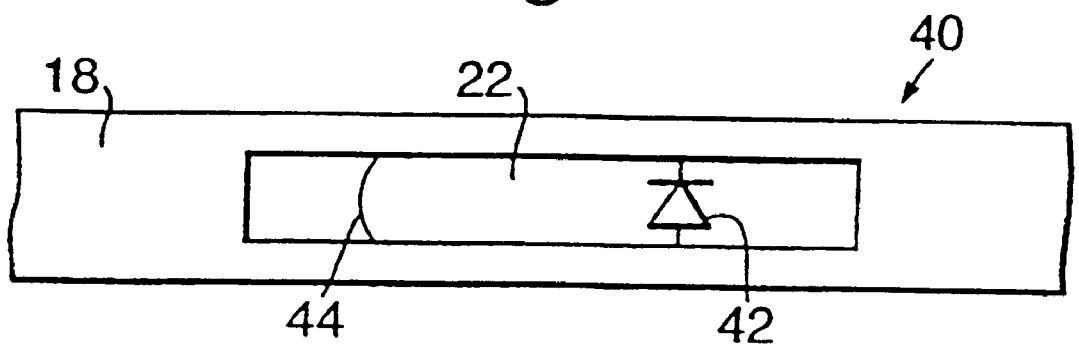
FIG. 6 is a schematic partial plan view of a second embodiment of the present invention.

Four further embodiments of the present invention are schematically shown in FIGS. 6 to 10 of the accompanying drawings. The second illustrated embodiment 40 (partially shown in FIG. 6) is similar to the first illustrated embodiment 4 (shown in FIGS. 1 to 5). As in the first embodiment 4, the second embodiment 40 comprises a body 18 provided with three elongate slots 20,22,24 (only the central slot 22 is shown in FIG. 6). However, in contrast with the first embodiment 4, the second embodiment 40 has a diode 42 and a shorting wire 44 spanning the width of each elongate slot 20,22,24. The bridges 26,28 are not included. The second embodiment 40 thereby operates as a diode mixer.

In an initial configuration of the second embodiment 40, the wire 44 short circuits the diode 42 so that the slots 20,22,24 radiate a strong signal upon interrogation with appropriate radio frequency energy. However, the wire 44 is either located in such a position or is manufactured from such a material that, upon achieving a specific condition of tire wear or temperature, it becomes broken and is no longer capable of shorting the diode 42. In this second configuration of the second embodiment 40, the width of one or more slots 20,22,24 is spanned by only a diode 42. As a result of the well known non-linear current versus voltage characteristic of diodes, the second embodiment 40 radiates a different radio frequency in the second configuration to that radiated in the first configuration. The radio frequency energy radiated in the second configuration is readily detected by an appropriate interrogation device 32. Thus, the user of a vehicle may be provided with an indication of a specific tire condition.

Figure 7:
FIG. 7 is a schematic side view of a third embodiment of the present invention.

A third illustrated embodiment 50 is shown in FIG. 7. The third embodiment 50 comprises two elongate strips of material 52,54 suitable for reflecting radio frequency energy of a specific wavelength. The two elongate strips 52,54 are connected by a connecting member 56. The arrangement is such that the two strips 52,54 and the connecting member 56 form a straight elongate member. In use, the third embodiment 50 is secured to an item, such as a tire, in a similar manner to that described in relation to the first and second embodiments 4,40. When a specific item condition is reached, the connecting member 56 is removed. This removal may occur as a result of abrasive wear or melting of the connecting member 56. The configuration of the third embodiment 50 is thereby changed from one in which said embodiment 50 comprises a single elongate element to one in which said embodiment 50 comprises two short and spaced apart elongate elements (i.e. the two elongate strips 52,54). Since the wavelength of radio frequency energy radiated by the third embodiment 50 depends upon its length, a detectable change in radiated energy will be produced when the connecting member 56 is removed. Accordingly, through monitoring with an appropriate interrogation device 32, the configuration of the third embodiment 50 (and, therefore, the condition of an item) may be determined and indicated to a user.

Fourth and fifth illustrated embodiments 60, 70 are shown in FIGS. 8–10. These two embodiments 60, 70 are minor modifications of the third embodiment 50 and function under the same principle. The fourth embodiment 60 comprises a single elongate strip of material which is bent so as to be formed with a centrally located raised ablatable kink or bridge member 62. The ablative bridge member 62 corresponds to the connecting member 56 of the third embodiment 50. The bridge member 62 is connected to and located between two elongate strip members 64, 66. The two elongate strip members 64, 66 and the bridge member 62 are formed from the same unitary elongate strip of material. As described for the third embodiment 50, the configuration of the fourth embodiment 60 may be changed in use from one in which said fourth embodiment 60 comprises a single elongate element to one in which said fourth embodiment 60 comprises two short and spaced apart elongate elements (i.e. the two elongate strips 64, 66).

The fifth embodiment 70 comprises two elongate elements 72, 74 arranged parallel to one another and connected to one another at their ends by cross-members 76, 78. The two elongate elements 72, 74 are each of the same construction as the fourth embodiment 60 Each element 72, 74 is therefore a unitary component having two elongate strips connected by an ablatable bridge member. The fifth embodiment 70 may be conveniently manufactured by stamping an elongate strip from a sheet of suitable material, stamping an elongate hole from the elongate strip so formed, and bending the remainder of the elongate slot so as to form two ablatable bridge members. In use, the bridge members may be removed as a result of abrasive wear.

Apparatus according to the present invention may be incorporated into a network of sensors. In such a system, the radio frequency energy transmitted to the apparatus of the present invention may also be used to illuminate one or more radio frequency tags which, in an automotive application, may provide a measure of tire pressure or temperature. Since the apparatus of the present invention will generally only detect a single occurrence of a change in item condition (for example, a change in tire condition from a safe level or wear to an unsafe level of wear), it is desirable for the radio frequency energy transmitted to said apparatus to be utilised in the interrogation of (and general communication with) other equipment.

The present invention is not limited to the specific embodiments or methods described above. Alternative arrangements and suitable materials will be apparent to a reader skilled in the art. For example, where the item condition to be detected is dependent upon temperature, a bi-metallic strip may be used instead of the shorting wire 44, the connecting member 56 or the bridges 26,28. The bi-metallic strip may be arranged so as to bend at a specific temperature and thereby impart at that temperature the required configuration change. Furthermore, an embodiment of the present invention may incorporate a linear mixer as opposed to the non-linear mixer described above with reference to FIG. 6. Also, it is possible to apply more than one frequency (e.g. 868 MHz and 2.45 GHz) to a mixer simultaneously. The combining/mixing of the frequencies causes a radiation from the mixer of a detectable "difference frequency". Other variations will be apparent to the skilled reader.

What is claimed is:

1. An apparatus for detecting when an item which is subject to wear has worn to a predetermined extent, the apparatus comprising: a structure for radiating radio frequency energy in response to reception by the structure of radio frequency energy, the structure including an ablatable portion which, when the ablatable portion is worn away, produces a change in the radio frequency energy which the structure radiates in response to reception by the structure of radio frequency energy; means for mounting the structure on the item so that, when the item has worn to the said predetermined extent, the ablatable portion of the structure has worn away; and means for detecting the change in the radio frequency energy which the structure radiates when the ablatable portion is worn away.

2. The apparatus as claimed in claim 1 wherein said structure comprises two spaced members which are connected to one another by said ablatable portion.

3. The apparatus as claimed in claim 1 wherein said structure comprises a plurality of ablatable portions.

4. The apparatus as claimed in claim 1, wherein said structure is a unitary component.

5. The apparatus as claimed in claim 1, wherein said structure comprises two elongate elements, first ends of the elements being connected to one another and second ends of the elements being connected to one another, each element comprising two spaced members which are connected to one another by a said ablatable portion.

6. Apparatus as claimed in any preceding claim, wherein said structure is a unitary component.

7. The apparatus as claimed in claim 1, wherein said structure defines at least one elongate slot.

8. The apparatus as claimed in claim 1, wherein said structure is of an elongate shape.

9. The apparatus as claimed in claim 7 wherein the ablatable portion comprises one or more bridge elements extending from one side of the at least one slot to the other side thereof.

10. The apparatus as claimed in claim 9, wherein the ablatable portion protrudes from the remainder of said structure so as to leave vacant the space defining the at least one slot.

11. The apparatus as claimed in claim 7, wherein one side of the at least one slot is connected to the other side thereof by means of a linear or non-linear mixer.

12. The apparatus as claimed in claim 1, wherein the ablatable portion comprises a bi-metallic strip.

13. A method for detecting when an item which is subject to wear has worn to a predetermined extent, the method comprising the steps of: providing a structure for radiating radio frequency energy in response to reception by the structure of radio frequency in response to reception by the structure of radio frequency energy, the structure including an ablatable portion which, when it is worn away, produces a change in the radio frequency energy which the structure radiates in response to reception by the structure of radio frequency energy; mounting the structure on the item so that, when the item has worn to the said predetermined extent, the ablatable portion of the structure has worn away; and detecting the change in the radio frequency energy which the structure radiates when the ablatable portion is worn away.

14. Apparatus as claimed in any of claims 10 to 13, wherein one side of the at least one slot is connected to the other side thereof by means of a linear or nonlinear mixer.

15. Apparatus as claimed in any of claims 2 to 9 or claims 12 and 13, wherein the member adapted to be ablated or the bridge element is a bi-metallic strip.

16. A method for detecting a specific condition of an item, the method comprising the steps of: providing said item with the apparatus defined hereinabove for detecting a specific item condition; transmitting radio frequency energy to said apparatus and receiving radio frequency energy radiated therefrom; and monitoring for radiated radio frequency energy corresponding to the attaining of said specific condition.

* * * * *